United States Patent
Kojima

(10) Patent No.: US 7,921,378 B2
(45) Date of Patent: Apr. 5, 2011

(54) INFORMATION PROCESSING DEVICE

(75) Inventor: Atsushi Kojima, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 807 days.

(21) Appl. No.: 11/861,261

(22) Filed: Sep. 25, 2007

(65) Prior Publication Data

US 2008/0126971 A1 May 29, 2008

(51) Int. Cl.
*G06F 3/048* (2006.01)
(52) U.S. Cl. ......... 715/825; 715/771; 715/810; 715/811
(58) Field of Classification Search .................. 715/771, 715/810, 811, 825
See application file for complete search history.

(56) References Cited

U.S. PATENT DOCUMENTS

| | | | | |
|---|---|---|---|---|
| 6,570,597 | B1 * | 5/2003 | Seki et al. | 715/835 |
| 7,451,162 | B2 * | 11/2008 | Hess | 1/1 |
| 2006/0184780 | A1 * | 8/2006 | Bala | 715/705 |
| 2006/0288308 | A1 * | 12/2006 | Enomoto et al. | 715/811 |
| 2007/0250785 | A1 * | 10/2007 | Nakamura et al. | 715/764 |
| 2010/0169782 | A1 * | 7/2010 | Chatani et al. | 715/730 |

FOREIGN PATENT DOCUMENTS

| | | |
|---|---|---|
| JP | 2000-200132 A | 7/2000 |
| JP | 2000-305695 A | 11/2000 |
| JP | 2001-195428 A | 7/2001 |
| JP | 2002335355 A | 11/2002 |
| JP | 2006-244326 A | 9/2006 |

OTHER PUBLICATIONS

Japanese Patent Office, Notification of Reasons of Rejection for Japanese Patent Application No. 2006-268023 (counterpart to above-captioned patent application), mailed Oct. 21, 2008.

* cited by examiner

*Primary Examiner* — William L Bashore
*Assistant Examiner* — Ashraf Zahr
(74) *Attorney, Agent, or Firm* — Baker Botts L.L.P.

(57) ABSTRACT

An information processing device is provided with a display unit, a selecting unit which allows a user to select one of the icons displayed on a display unit. A relevance acquisition unit is provide to acquire the degree of relevance between a selected setting item corresponding to the selected icon and each of the other setting items by referring to a relevance table when one of the icons displayed by the display unit is selected. The information processing device also includes a display control unit which rearranges the icons displayed on the display unit such that the icon corresponding to the selected setting item and the icons respectively corresponding to the other setting items are arranged in accordance with the degrees of relevance to indicate the relevance thereamong.

11 Claims, 12 Drawing Sheets

| | SETTING ITEM #1 | SETTING ITEM #2 | SETTING ITEM #3 | SETTING ITEM #4 | SETTING ITEM #5 | SETTING ITEM #6 |
|---|---|---|---|---|---|---|
| SETTING ITEM #1 | 100 | 0 | 25 | 50 | 70 | 0 |
| SETTING ITEM #2 | 0 | 100 | 0 | 50 | 0 | 25 |
| SETTING ITEM #3 | 25 | 0 | 100 | 25 | 50 | 0 |
| SETTING ITEM #4 | 50 | 50 | 25 | 100 | 25 | 75 |
| SETTING ITEM #5 | 70 | 0 | 50 | 25 | 100 | 0 |
| SETTING ITEM #6 | 0 | 25 | 0 | 75 | 0 | 100 |
| SETTING ITEM #1 | | | | | | |
| SETTING ITEM #2 | | | | | | |
| SETTING ITEM #3 | | | | | | |
| SETTING ITEM #4 | | | | | | |
| SETTING ITEM #5 | DEPENDENT | | | | | |
| SETTING ITEM #6 | | | | | | |
| STATUS | NO | NO | NO | NO | NO | YES |

21 RELEVACE TABLE

|  | SETTING ITEM #1 | SETTING ITEM #2 | SETTING ITEM #3 | SETTING ITEM #4 | SETTING ITEM #5 | SETTING ITEM #6 |
|---|---|---|---|---|---|---|
| SETTING ITEM #1 | 100 | 0 | 25 | 50 | 70 | 0 |
| SETTING ITEM #2 | 0 | 100 | 0 | 50 | 0 | 25 |
| SETTING ITEM #3 | 25 | 0 | 100 | 25 | 50 | 0 |
| SETTING ITEM #4 | 50 | 50 | 25 | 100 | 25 | 75 |
| SETTING ITEM #5 | 70 | 0 | 50 | 25 | 100 | 0 |
| SETTING ITEM #6 | 0 | 25 | 0 | 75 | 0 | 100 |

22 SETTING COMPLETION TABLE

|  | STATUS |
|---|---|
| SETTING ITEM #1 | NO |
| SETTING ITEM #2 | NO |
| SETTING ITEM #3 | NO |
| SETTING ITEM #4 | NO |
| SETTING ITEM #5 | NO |
| SETTING ITEM #6 | YES |

FIG. 3

23 DEPENDENCE RELATIONSHIP TABLE

|  | SETTING ITEM #1 | SETTING ITEM #2 | SETTING ITEM #3 | SETTING ITEM #4 | SETTING ITEM #5 | SETTING ITEM #6 |
|---|---|---|---|---|---|---|
| SETTING ITEM #1 |  |  |  |  |  |  |
| SETTING ITEM #2 |  |  |  |  |  |  |
| SETTING ITEM #3 |  |  |  |  |  |  |
| SETTING ITEM #4 |  |  |  |  |  |  |
| SETTING ITEM #5 | DEPENDENT |  |  |  |  |  |
| SETTING ITEM #6 |  |  |  |  |  |  |

FIG. 4

|  | SETTING ITEM #1 | SETTING ITEM #2 | SETTING ITEM #3 | SETTING ITEM #4 | SETTING ITEM #5 | SETTING ITEM #6 |
|---|---|---|---|---|---|---|
| SETTING ITEM #1 | 100 | 0 | 25 | 50 | 70 | 0 |
| SETTING ITEM #2 | 0 | 100 | 0 | 50 | 0 | 25 |
| SETTING ITEM #3 | 25 | 0 | 100 | 25 | 50 | 0 |
| SETTING ITEM #4 | 50 | 50 | 25 | 100 | 25 | 75 |
| SETTING ITEM #5 | 70 | 0 | 50 | 25 | 100 | 0 |
| SETTING ITEM #6 | 0 | 25 | 0 | 75 | 0 | 100 |
| SETTING ITEM #1 | | | | | | |
| SETTING ITEM #2 | | | | | | |
| SETTING ITEM #3 | | | | | | |
| SETTING ITEM #4 | | | | | | |
| SETTING ITEM #5 | DEPENDENT | | | | | |
| SETTING ITEM #6 | | | | | | |
| STATUS | NO | NO | NO | NO | NO | YES |

23 DEPENDENCE RELATIONSHIP TABLE

| | SETTING ITEM #1 | SETTING ITEM #2 | SETTING ITEM #3 | SETTING ITEM #4 | SETTING ITEM #5 | SETTING ITEM #6 |
|---|---|---|---|---|---|---|
| SETTING ITEM #1 | | | | | | |
| SETTING ITEM #2 | | | | | | |
| SETTING ITEM #3 | DEPENDENT | | | | DEPENDENT | |
| SETTING ITEM #4 | | | | | | |
| SETTING ITEM #5 | DEPENDENT | | | | | |
| SETTING ITEM #6 | | | | | | |

FIG.18

INFORMATION PROCESSING DEVICE

CROSS REFERENCE TO RELATED APPLICATION

This application claims priority from Japanese Patent Application No. 2006-268023, filed on Sep. 29, 2006, the entire subject matter of which is incorporated herein by reference.

BACKGROUND OF THE INVENTION

1. Field of the Invention

The present invention relates to an information processing device capable of displaying multiple icons corresponding to changeable setting items.

2. Related Art

A user of an information processing device is generally capable of making settings of multiple setting items of the information processing device for using functions of the device (or making settings of multiple setting items of an external device connected to the information processing device for using functions of the external device) by operating the information processing device.

Such functions can include a function that requires the user to make setting of two or more setting items for the use of the function.

As a result, even when a user of an information processing device hopes to make setting of a desired function to make the function available, it is sometimes difficult for the user to find an intended setting item quickly due to a too large number of setting items needing the setting.

Further, with the increasing number of functions of a device, there are cases where a setting item regarding a function that the user hopes to set is also in use for different functions. Thus, it is becoming difficult to achieve an intended function by just setting one setting item and the user generally has to further make setting of related setting items in many cases. As above, making appropriate settings is becoming more and more difficult for users.

Under such circumstances, an information processing device, designed to indicate setting items needing the setting when the user switches a particular function to an available state, for example, to let the user easily recognize such setting items, has been proposed. An example of such a device is disclosed in Japanese Patent Provisional Publication No. P2002-335355A.

When a function for which the user hopes to make setting is selected by the user, the information processing device indicates only setting items that are related to the selected function so as to let the user easily recognize the related setting items.

SUMMARY OF THE INVENTION

However, even if only the setting items related to the selected function are just indicated as above, the user may be ignorant of which setting item should be set preferentially. Further, some setting items can have a certain rule regarding the order of setting. Therefore, the method just indicating related setting items is insufficient for letting the user make necessary settings properly.

Aspects of the present invention are advantageous in that an information processing device, an icon displaying method and a program, capable of letting the user easily recognize relevant setting items (setting items that are relevant to a (provisionally) selected setting item) along with the degree of relevance between the (provisionally) selected setting item and each of the relevant setting items when the user makes setting of values/conditions of a plurality of settable (changeable) setting items regarding the functions of the information processing device, can be provided.

According to aspects of the invention, there is provided an information processing device having multiple setting items. The information processing device is provided with a display unit, a selecting unit which allows a user to select one of the icons displayed on a display unit. The information processing device has a relevance table defining a degree of relevance between each pair of setting items included in the multiple setting items. A relevance acquisition unit is provide to acquire the degree of relevance between a selected setting item corresponding to the selected icon and each of the other setting items by referring to the relevance table when one of the icons displayed by the display unit is selected. The information processing device also includes a display control unit which rearranges the icons displayed on the display unit such that the icon corresponding to the selected setting item and the icons respectively corresponding to the other setting items are arranged in accordance with the degrees of relevance acquired by the relevance acquisition unit to indicate the relevance thereamong.

Optionally, the display control unit may display the icons of the selected setting item and the other setting items such that an icon corresponding to a setting item having a higher degree of relevance to the selected setting item is located at a position closer to the selected icon.

Further optionally, the display control unit displays the icons of the selected setting item and the other setting items on the display unit such that the icons of other setting items whose degrees of relevance to the selected setting item acquired by the relevance acquisition unit are a prescribed standard or higher are partially overlapped with the selected icon, the icon corresponding to a setting item having a higher degree of relevance being placed as an upper layer stacked over the icons of less relevant setting items.

With the above configuration, when one of the icons displayed on the display unit is selected, the selected icon and the icons of the other setting items are displayed in accordance with the degree of relevance with respect to the selected setting item. Therefore, the user can easily recognize the degree of relevance between the selected setting item and each of the other setting items based on the distance between the icons.

Incidentally, the display unit may either be provided integrally with the information processing device or separately from the information processing device to communicate therewith via a cable or wireless connection.

The "icon" is not restricted to a typical icon (figure, symbol, etc.) representing a setting item corresponding to the icon; the "icon" can also be a character string representing a setting item to which a set value should actually be inputted, an input window of a setting item, etc.

The "selection of an icon" can mean not only actual selection of the icon but also a state in which a pointer (mouse pointer, cursor, etc.) is placed on the icon (provisional selection).

According to another aspect of the invention, there is provided a record medium storing computer-readable instructions that cause a computer of an information processing device having multiple setting items to function as the information processing device described above.

With the above record mediums, effects similar to those of the information processing devices described above can be achieved.

According to further aspects of the invention, there is provided an icon displaying method for displaying icons corresponding to multiple setting items of a device on a display unit. The method includes the steps of (1) referring to a relevance table, which indicates the degree of relevance between each pair of setting items included in the multiple setting items, to acquire the degree of relevance between a selected setting item corresponding to the selected icon and each of the other setting items in response to one of icons displayed by the display unit being selected, and (2) rearranging the icons displayed on the display unit such that the icons corresponding to the other setting items are rearranged based on the acquired degrees of relevance to indicate the degrees of relevance.

Optionally, the step of rearranging the icons may locate the icon of a setting item having a higher degree of relevance to the selected setting item at a position closer to the selected icon.

Further optionally, the step of rearranging may display the icons of the selected setting item and the other setting items on the display unit such that the icons of other setting items whose degrees of relevance to the selected setting item are a prescribed standard or higher are partially overlapped with the selected icon, the icon corresponding to a setting item having a higher degree of relevance being placed as an upper layer stacked over the icons of less relevant setting items.

With the above icon displaying methods, effects similar to those of the information processing devices described above can be achieved.

BRIEF DESCRIPTION OF THE
ACCOMPANYING DRAWINGS

FIG. 3 is a table showing an example of the structure of a setting completion table.

FIG. 4 is a table showing an example of the structure of a dependence relationship table.

FIG. 18 is a table showing another example of the dependence relationship table.

Figures 1, 2:
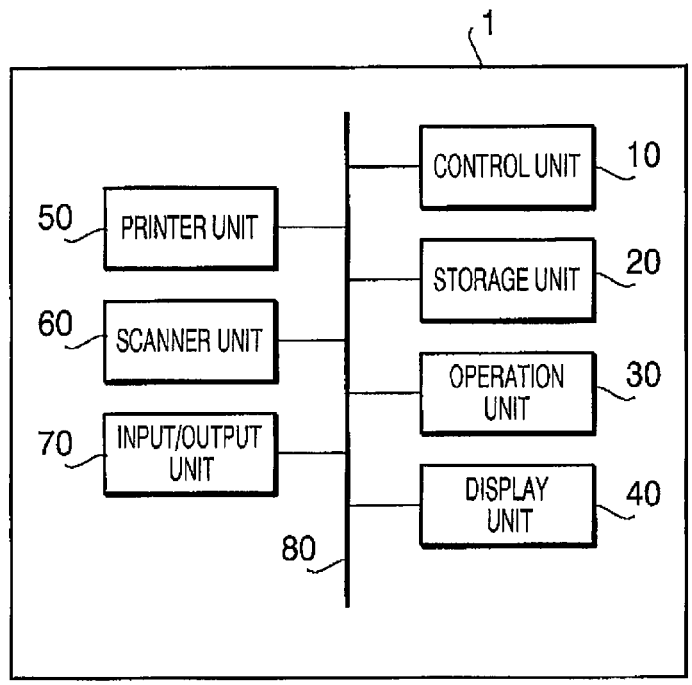
FIG. 1 is a block diagram showing the composition of an MFP (Multi-Function Peripheral) as an information processing device in accordance with an embodiment of the present invention.
FIG. 2 is a table showing an example of the structure of a relevance table.

DETAILED DESCRIPTION OF THE
EMBODIMENT

Referring now to the drawings, a description will be given in detail of a preferred embodiment in accordance with the present invention. In the following, an information processing device in accordance with the present invention will be described taking a digital MFP (Multi-Function Peripheral), having a copy function, a printer function, a scanner function, a facsimile function, etc. in one body (hereinafter simply referred to as an "MFP") as an example.

<Overall Configuration>

FIG. 1 is a block diagram showing the composition of an MFP 1 as an information processing device in accordance with an embodiment of the present invention.

As shown in FIG. 1, the MFP 1 includes a control unit 10, a storage unit 20, an operation unit 30, a display unit 40, a printer unit 50, a scanner unit 60 and an input/output unit 70 which are connected together by a bus 80.

The control unit 10 is a central processing unit for controlling the MFP 1. The operations of the components of the MFP 1 are controlled by the control unit 10 based on various programs and a variety of information (information on the MFP 1, information necessary for communicating with other terminals via a network, etc.) stored in the storage unit 20.

The storage unit 20 stores programs and information necessary for various processes executed by the MFP 1. The storage unit 20 can include an HDD (Hard Disk Drive), a ROM (Read Only Memory), a RAM (Random Access Memory), an NVRAM (NonVolatile RAM), etc. The storage unit 20 stores various tables such as a relevance table 21, a setting completion table 22 and a dependence relationship table 23 (see FIGS. 7 and 13). The tables stored in the storage unit 20 further include a display table 24 which is generated by the control unit 10 for properly displaying a setting screen (used for setting and changing functions of the MFP 1) on the display unit 40.

<Relevance Table>

The relevance table 21 is a table storing information regarding the degree of relevance between each pair of setting items (regarding the functions of the MFP 1) whose set values can be changed by the user.

The setting items are assumed in this embodiment to have been prepared for the functions (printer function, network function, modem function, facsimile function, etc.) of the MFP 1, respectively. In the following explanation, each setting item will be just expressed as "setting item #1", "setting item #2", etc. (without specifying a function of the MFP 1 corresponding to the setting item) for convenience of explanation. Thus, the setting items #1 and #2, for example, mean setting items of different functions of the MFP 1 in this embodiment.

In this embodiment, the relevance table 21 describes the degree of relevance between each pair of setting items (regarding functions of the MFP 1) by use of a number (hereinafter referred to as a "relevance index") as shown in FIG. 2, in which a larger relevance index means higher relevance.

For example, in the relevance table 21 shown in FIG. 2, the degree of relevance between the setting items #1 and #5 is higher than that between the setting items #1 and #3 since the relevance index between the setting items #1 and #5 is "70" and that between the setting items #1 and #3 is "25".

Incidentally, the relevance index can also be defined differently to let a smaller relevance index mean less relevance. In this case, the degree of relevance is regarded to be higher than a prescribed standard when the relevance index is smaller than a prescribed threshold value. Further, the degree of relevance stored in the relevance table 21 is not restricted to a number (relevance index); the degree of relevance may also be expressed as textual information such as "high", "medium" and "low" or "A", "B" and "C".

<Setting Completion Table>

The setting completion table 22 is a table storing information on whether the setting of each setting item (for a function of the MFP 1) has already been completed or not.

In this embodiment, the setting completion table 22 describes whether the setting of each setting item has already been completed or not in terms of "YES" or "NO" as shown in FIG. 3, in which each setting item whose setting has already been completed is assigned a value "YES" while each setting item whose setting has not been completed yet is assigned a value "NO".

In the setting completion table 22 shown in FIG. 3, for example, the setting has not been completed for the setting items #1-#5 (completed for the setting item #6 only).

<Dependence Relationship Table>

The dependence relationship table 23 is a table storing information regarding the dependence relationship between each pair of setting items (regarding the functions of the MFP 1) whose set values can be changed by the user.

In this embodiment, the dependence relationship table 23 describes whether there exists the dependence relationship between each pair of setting items or not as shown in FIG. 4, in which setting items having the dependence relationship between each other are assigned a value "DEPENDENT".

In the dependence relationship table 23 shown in FIG. 4, for example, the value "DEPENDENT" in the row of the setting item #5 means that the setting item #5 is dependent on the setting item #1.

Here, the "dependent setting item" means a setting item of another function for which the setting becomes necessary when the setting of a setting item (of a function of the MFP 1) has been made.

For example, a setting item of the modem function of the MFP 1 (which is used for the connection with a telephone circuit) is dependent on a setting item of the facsimile function.

Incidentally, while each pair of setting items having the dependence relationship between each other are assigned the value "DEPENDENT" in the dependence relationship table 23 of FIG. 4, it is also possible to assign other values (e.g. "1") to such setting items.

While the following explanation of the operation of the control unit 10 will be given assuming that these tables (relevance table 21, setting completion table 22, dependence relationship table 23) are stored in the storage unit 20 separately, the embodiment in accordance with the present invention is not restricted to such a table configuration.

Figures 5, 6:
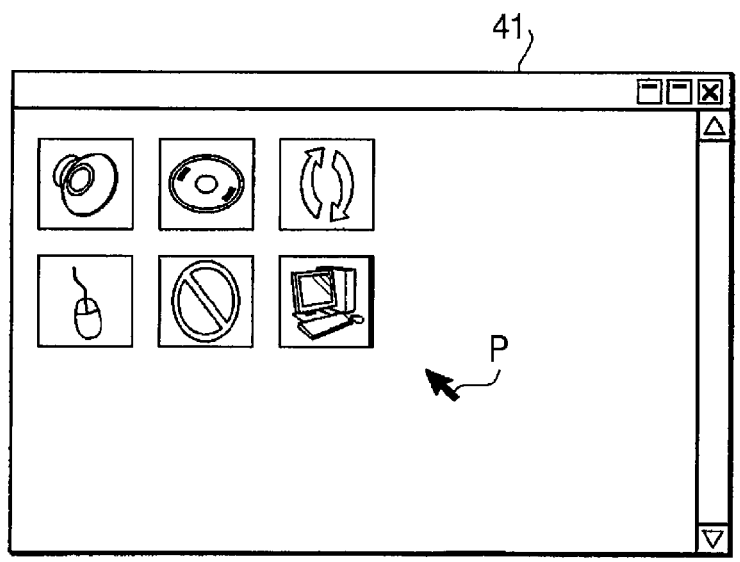
FIG. 5 is a table showing an example of the structure of an integrated table which is formed by integrating the relevance table, the setting completion table and the dependence relationship table.
FIG. 6 is a screen image showing an example of a setting screen which is displayed on a display unit of the MFP.

For example, a table integrating the relevance table 21, the setting completion table 22 and the dependence relationship table 23 (integrated table) may also be prepared and stored in the storage unit 20. An example of such an integrated table (formed by integrating the contents of the relevance table 21, the setting completion table 22 and the dependence relationship table 23) is shown in FIG. 5.

<Display Table>

The display table 24 is a table storing information specifying appearance positions of icons of setting items (which are prepared for function of the MFP 1, respectively) on a setting screen (user interface) when the setting screen is displayed on the display unit 40 to let the user set and change the functions. The display table 24 is generated by a display control unit 12 (explained later) of the control unit 10.

Since the contents of the display table 24 can vary depending on the configuration of the control unit 10, the details of the display table 24 will be described later in an explanation of the configuration of the control unit 10.

The operation unit 30 serves as an input unit for letting the user set the functions of the MFP 1 and operate the MFP 1. The operation unit 30 can include a keyboard and a mouse which are connected to the MFP 1, buttons provided on the MFP 1, etc. (unshown). The operation unit 30 is designed properly so that the aforementioned various tables can be edited through the operation unit 30.

The display unit 40 displays a variety of information regarding the MFP 1, such as information on the settings of the functions of the MFP 1, information about the printing of information, etc.

In this embodiment, the display unit 40 is implemented by a liquid crystal display (which is provided on the MFP 1), etc. The display unit 40 is capable of displaying a user interface (setting screen 41 for letting the user set the functions of the MFP 1) according to a display instruction, etc. outputted by the control unit 10.

FIG. 6 is a screen image showing an example of the setting screen 41. On the setting screen 41 of FIG. 6, a plurality of icons of the functions of the MFP 1 are displayed. Each of the icons to be displayed on the setting screen 41 is prepared to represent each function of the MFP 1, respectively. When the user moves a pointer P (the arrow displayed on the screen) to a desired icon and clicks on the icon, a window for letting the user change the setting of a function of the MFP 1 corresponding to the icon (detailed setting screen) is displayed.

Incidentally, in the following figures for explaining the setting screen 41 (e.g. FIG. 9), character strings "SETTING ITEM #1", "SETTING ITEM #2", etc. corresponding to the functions of the MFP 1 (corresponding to the icons) will be shown instead of the icons themselves for convenience of explanation. Thus, the character string "SETTING ITEM #1" in the following figures of the setting screen 41 means that an icon corresponding to the setting item #1 is being displayed on the setting screen 41.

Incidentally, the "icon" in this embodiment is not restricted to a typical icon (figure, symbol, etc.) representing a setting item (function of the MFP 1) corresponding to the icon; the "icon" can also be a character string representing a setting item to which a set value should actually be inputted, an input window of a setting item, etc.

The printer unit 50 is a unit for printing (fixing) a variety of information (characters, images, etc.) on print media (paper, etc.) by monochrome printing or color printing, that is, a unit having the printer function. The printer unit 50 executes the printing of print data, etc. according to instructions from the control unit 10.

The scanner unit 60 is a unit for optically scanning a document (printed matter, etc.) and thereby generating image data. The image data obtained by the scanner unit 60 is properly stored in the storage unit 20, while being transferred to a terminal that requested the scanning.

The input/output unit 70 is a unit for exchanging information with external terminals via a network, etc. When the MFP 1 is used as a printer, for example, the input/output unit 70 functions as an input interface through which print data, etc. transmitted from an external terminal are inputted to the MFP 1.

<Control Unit: First Configuration>

In the following, a first configuration of the control unit 10, for letting the MFP 1 (information processing device in accordance with the present invention) desirably perform its main functions, will be described in detail.

In the MFP 1 (information processing device) equipped with the control unit 10 according to the first configuration, when an icon of a setting item is provisionally selected by the user from multiple icons (corresponding to multiple setting items) displayed on the setting screen 41 for changing the setting of a function of the MFP 1, icons of setting items having higher relevancies to the provisionally selected setting item are displayed closer to the provisionally selected icon, so as to let the user easily recognize setting items that need setting changes. Specifically, the higher the relevancy of a setting item corresponding to an icon is, the closer the icon is located with respect to the provisionally selected icon.

The above "provisional selection" means a state in which the pointer P is placed on an icon displayed on the setting screen in cases where a mouse is employed as the operation unit 30, that is, the state just before the icon is actually selected by the user by clicking on the icon.

Therefore, when a different input device (keyboard, etc.) is used as the operation unit 30, the "provisional selection" means a state just before the selection of an icon is confirmed (e.g. the state in which the cursor (an example of the pointer P) is placed on the icon).

In cases where the selection of an icon is confirmed by a double click, a single click may be regarded as the provisional selection.

Figure 7:
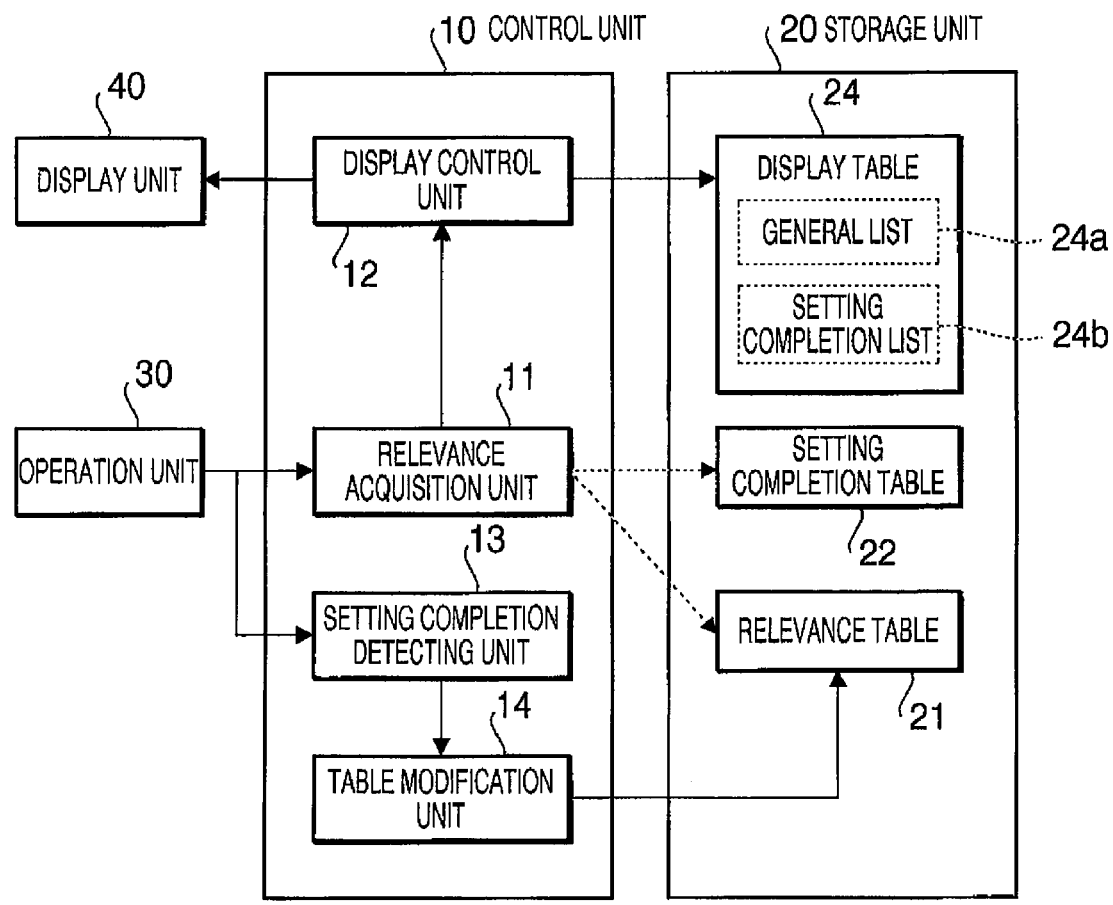
FIG. 7 is a block diagram for explaining a first configuration of a control unit of the MFP and the relationship between the control unit and each table stored in a storage unit of the MFP.

FIG. 7 is a block diagram for explaining the first configuration of the control unit 10 and the configuration of the storage unit 20.

As shown in FIG. 7, the control unit 10 according to the first configuration includes a relevance acquisition unit 11 and the aforementioned display control unit 12 as its main components.

When the pointer P is placed on one of the icons displayed on the setting screen (the screen for setting the functions of the MFP 1) being displayed on the display unit 40, that is, when an icon is provisionally selected, the relevance acquisition unit 11 refers to the relevance table 21 stored in the storage unit 20 and acquires information on the degree of relevance between the setting item corresponding to the provisionally selected icon (provisionally selected setting item) and each of the setting items corresponding to the other icons.

Specifically, when the pointer P is placed by the user on an icon on the setting screen 41 being displayed on the display unit 40, the operation unit 30 generates information (provisional selection information) indicating which icon (corresponding to a setting item) has been provisionally selected, that is, on which icon the pointer P has been placed. The provisional selection information generated by the operation unit 30 is inputted to the relevance acquisition unit 11.

The relevance acquisition unit 11 receiving the provisional selection information identifies the provisionally selected setting item based on the provisional selection information, refers to the relevance table 21, and thereby acquires the degree of relevance between the provisionally selected setting item and each of other setting items (hereinafter referred to as "target setting items"). Subsequently, the relevance acquisition unit 11 generates information indicating the acquired relevance (relevance information) and outputs the relevance information to the display control unit 12.

Further, the relevance acquisition unit 11 checks whether the setting of each target setting item has already been completed or not by referring to the setting completion table 22, generates setting completion information indicating whether the setting of each target setting item has been completed or not, and outputs the setting completion information to the display control unit 12.

Here, a specific case where the provisionally selected setting item is the setting item #5 will be described by way of example referring to the relevance table 21 and the setting completion table 22 shown in FIGS. 2 and 3.

In the case where the provisionally selected setting item specified by the provisional selection information is the setting item #5, the relevance acquisition unit 11 refers to the relevance table 21 and thereby acquires the degree of relevance between the provisionally selected setting item #5 and each of the other setting items #1, #2, #3, #4 and #6. Subsequently, the relevance acquisition unit 11 generates the relevance information indicating the acquired relevance and outputs the relevance information to the display control unit 12.

In the case of the relevance table 21 shown in FIG. 2, the relevance information generated by the relevance acquisition unit 11 indicates that the degree of relevance between the setting items #5 and #1 is "70", the degree of relevance between the setting items #5 and #2 is "0", the degree of relevance between the setting items #5 and #3 is "50", the degree of relevance between the setting items #5 and #4 is "25", and the degree of relevance between the setting items #5 and #6 is "0".

The relevance acquisition unit 11 further generates the setting completion information indicating that the status of the setting items #1, #2, #3 and #4 is "NO" and that of the setting item #6 is "YES" in the case of the setting completion table 22 shown in FIG. 3, and outputs the generated setting completion information to the display control unit 12.

The display control unit 12 is a unit for the display control of the display unit 40. When the pointer P is placed on one of the icons displayed on the setting screen (provisional selection), the display control unit 12 controls the display unit 40 so that an icon having a higher degree of relevance to the provisionally selected icon is displayed at a position closer to the provisionally selected icon.

Specifically, upon reception of the relevance information and the setting completion information, the display control unit 12 generates the display table 24 specifying the appearance positions of the icons of the target setting items (setting items other than the provisionally selected setting item) on the setting screen 41. Subsequently, the display control unit 12 generates a signal (display data) for instructing the display unit 40 to display the icons of the target setting items at the appearance positions specified by the generated display table 24 (hereinafter referred to as a "display instruction") and outputs the display instruction to the display unit 40.

Figure 8:
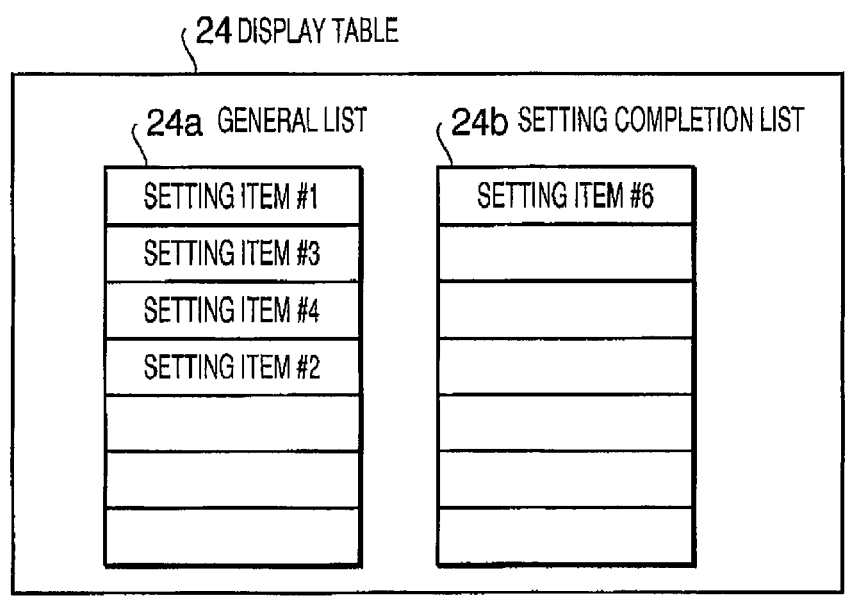
FIG. 8 is a table for briefly explaining the structure of a display table which is generated by the control unit according to the first configuration.

When the first configuration is employed, the display table 24 is formed to include a general list 24a and a setting completion list 24b as shown in FIGS. 7 and 8.

In the general list 24a, the target setting items (setting items other than the provisionally selected setting item) are listed in descending order of relevance to the provisionally selected setting item when one of the icons displayed on the setting screen is provisionally selected.

Meanwhile, in the setting completion list 24b, target setting items for which the setting has already been completed are listed when one of the icons displayed on the setting screen is provisionally selected.

In this display table 24, the appearance positions of the icons of the target setting items on the setting screen are specified according to the following rules: The icons of the target setting items listed in the setting completion list 24b should be displayed at positions far from the provisionally selected icon on the setting screen irrespective of the degree of relevance to the provisionally selected icon. Meanwhile, the icons of the target setting items listed in the general list 24a should be displayed on the setting screen so that the distance between the provisionally selected icon and the icon of each target setting item increases in order of the list (i.e. as the degree of relevance to the provisionally selected setting item decreases).

Therefore, the display control unit 12 of the control unit 10 according to the first configuration extracts setting items for which the setting has already been completed from the target setting items (setting items other than the provisionally selected setting item) based on the setting completion information supplied from the relevance acquisition unit 11, and stores the extracted setting items in the setting completion list 24b while storing the remaining target setting items (for which the setting has not been completed yet) in the general list 24a.

Subsequently, the display control unit 12 sorts the target setting items stored in each list (general list 24a, setting completion list 24b) in the descending order of relevance to the provisionally selected setting item based on the relevance information supplied from the relevance acquisition unit 11. Based on the general list 24a and the setting completion list 24b prepared as above, the display table 24 is generated.

Thereafter, the display control unit 12 generates a signal (display data) for instructing the display unit 40 to display the icons of the target setting items at the appearance positions specified by the generated display table 24 (display instruction) and outputs the display instruction to the display unit 40.

Here, a specific case where the contents of the relevance information are generated based on the relevance table 21 shown in FIG. 2, the contents of the setting completion information are generated based on the setting completion table 22 shown in FIG. 3 and the provisionally selected setting item is the setting item #5 will be described by way of example.

The display control unit 12 extracts the setting item #6 for which the setting has already been completed from the target setting items #1, #2, #3, #4 and #6 (setting items other than the provisionally selected setting item #5) based on the setting completion information, and stores the extracted setting item #6 in the setting completion list 24b while storing the remaining target setting items #1, #2, #3 and #4 in the general list 24a.

Subsequently, the display control unit 12 sorts the target setting items stored in each list (general list 24a, setting completion list 24b) in the descending order of relevance to the provisionally selected setting item #5 based on the relevance information. In this specific case, the sorting is unnecessary for the setting completion list 24b which includes the setting item #6 only.

Since the general list 24a includes the setting items #1, #2, #3 and #4 and their degrees of relevance (relevance indexes) to the provisionally selected setting item #5 are "70", "0", "50" and "25" as mentioned above (see FIG. 2), the setting items are successively stored in the general list 24a in the order of #1, #3, #4 and #2 as shown in FIG. 8.

Subsequently, the display control unit 12 generates the display table 24 explained above by use of the general list 24a and the setting completion list 24b. Thereafter, the display control unit 12 generates the display instruction (ordering the displaying of the icons of the target setting items at the appearance positions specified by the generated display table 24) and outputs the display instruction to the display unit 40.

Specifically, the above display instruction generated by the display control unit 12 instructs the display unit 40 to display the icon of the setting item #6 (stored in the setting completion list 24b of the display table 24) at a position farthest from the icon of the provisionally selected setting item #5 while displaying the icons of the setting items #1, #3, #4 and #2 (stored in the general list 24a of the display table 24 in this order) so that the icons gradually become farther (in the order of #1, #3, #4 and #2) from the icon of the provisionally selected setting item #5 (with the icon of the setting item #1 placed in the close vicinity of the icon of the provisionally selected setting item #5).

On the display unit 40, the icons of the target setting items #1, #2, #3, #4 and #6 are placed around the icon of the provisionally selected setting item #5 at the positions specified by the display instruction, in which the icon of a setting item having higher relevance to the provisionally selected setting item #5 is placed closer to the provisionally selected icon. Therefore, the user is allowed to easily recognize and grasp the degrees of relevance between the provisionally selected setting item #5 and the target setting items #1, #2, #3, #4 and #6.

Figure 9:
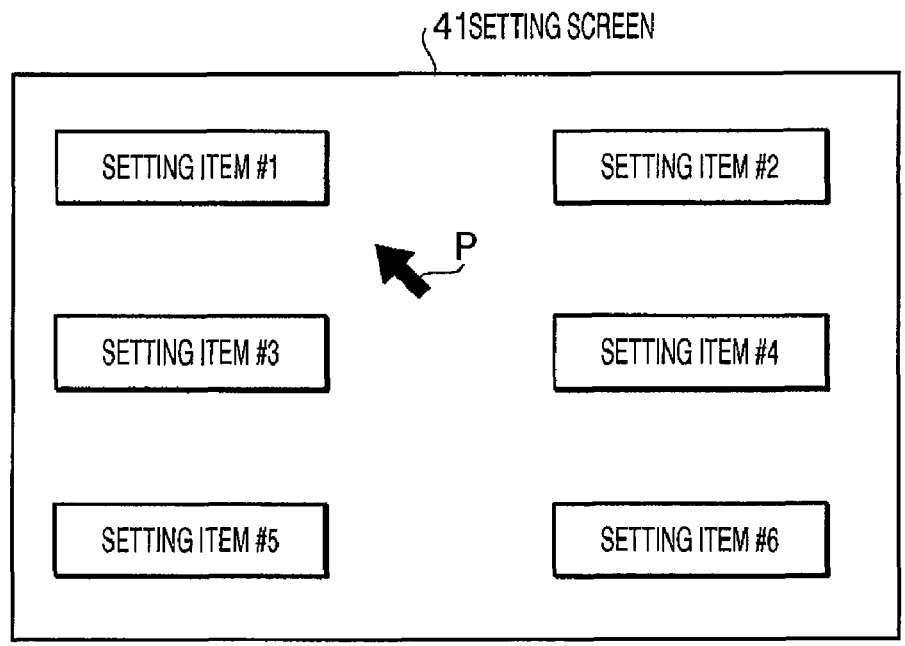
FIG. 9 is a schematic diagram for explaining the original state of icons of setting items displayed on the setting screen.
Figure 10:
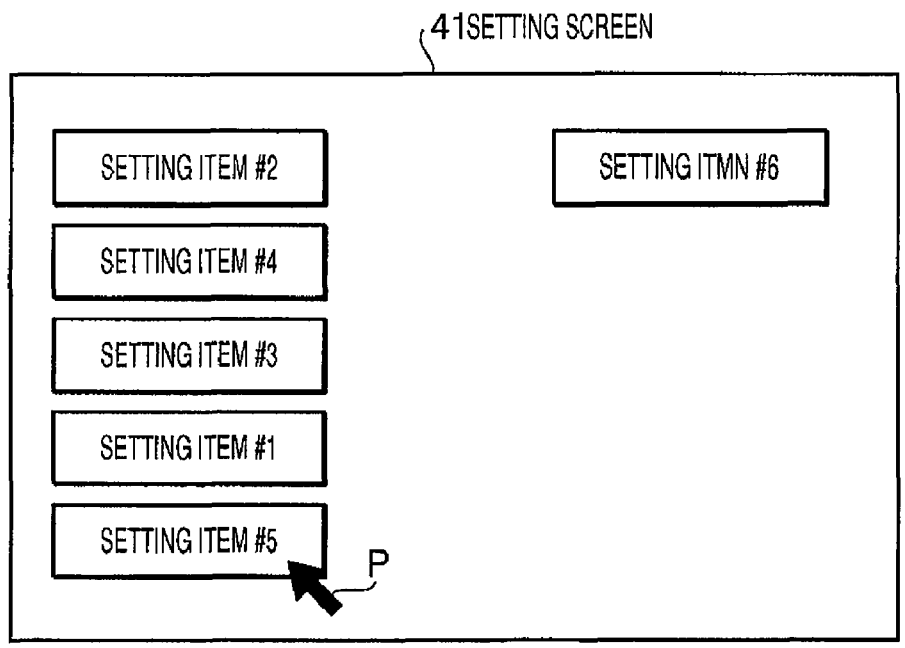
FIG. 10 is a schematic diagram for explaining a state in which icons of target setting items (setting items other than a provisionally selected setting item) are displayed on the setting screen to become farther from the provisionally selected icon in descending order of relevance to the provisionally selected setting item.

To sum up, when the pointer P is moved by the user operating the operation unit 30 onto the icon of the setting item #5 (provisional selection) on the setting screen 41 shown in FIG. 9, the icons of setting items having high relevance to the provisionally selected setting item #5 are displayed at positions close to the provisionally selected icon (see FIG. 10) by a process executed by the aforementioned units of the control unit 10, in which the icon of a setting item having a higher degree of relevance to the provisionally selected setting item #5 is displayed closer to the icon of the provisionally selected setting item #5, by which the user can easily recognize the degrees of relevance between the provisionally selected setting item #5 and the target setting items.

Figure 11:
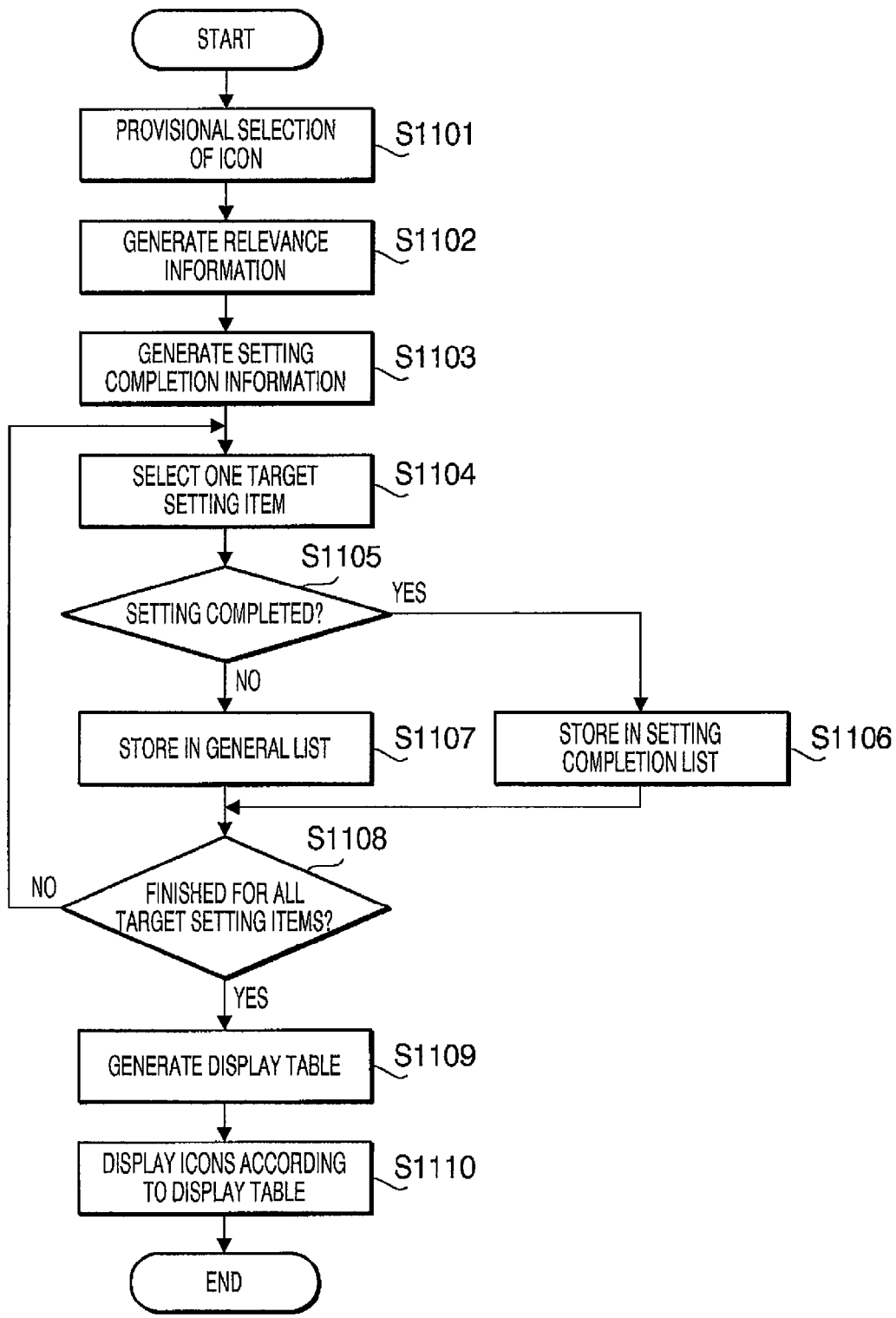
FIG. 11 is a flow chart for explaining information processing executed by an information processing device that is equipped with the control unit according to the first configuration shown in FIG. 7.

In the following, information processing executed by an information processing device that is equipped with the control unit 10 according to the first configuration shown in FIG. 7 will be explained referring to a flow chart of FIG. 11.

First, when the user viewing the setting screen 41 of FIG. 9 displayed on the display unit 40 provisionally selects an icon of a setting item (e.g. setting item #5) by moving the pointer P onto the icon (S1101), the provisional selection information (indicating which setting item has been provisionally selected) is generated by the operation unit 30 and outputted to the relevance acquisition unit 11.

The relevance acquisition unit 11 receiving the provisional selection information identifies the provisionally selected setting item, refers to the relevance table 21, and thereby acquires the degree of relevance between the provisionally selected setting item and each of the other setting items (target setting items). Subsequently, the relevance acquisition unit 11 generates the relevance information indicating the acquired relevance (S1102) and outputs the generated relevance information to the display control unit 12.

Further, the relevance acquisition unit 11 checks whether the setting of each target setting item (regarding a function of the information processing device) has been completed or not by referring to the setting completion table 22, generates the setting completion information indicating whether the setting of each target setting item has been completed or not (S1103) and outputs the generated setting completion information to the display control unit 12.

The display control unit 12 receiving the relevance information and the setting completion information selects one of the target setting items as a target of inspection in order to successively distribute the target setting items into appropriate lists (general list 24a, setting completion list 24b) of the display table 24 (S1104).

Subsequently, the display control unit 12 checks whether the setting of the target setting item as the inspection target has already been completed or not by referring to the setting completion information (S1105). If the setting has already been completed (S1105: YES), the target setting item is stored in the setting completion list 24b (S1106), otherwise (S1105S: NO) the target setting item is stored in the general list 24a (S1107).

Subsequently, the display control unit 12 checks whether the distribution has been finished for all the target setting items or not (S1108). If the distribution has not been finished for all the target setting items (S1108: NO), the distribution of S1104-S1107 is repeated until all the target setting items are processed.

If the distribution has been finished for all the target setting items (S1108: YES), the display control unit 12 sorts the target setting items stored in each list in the descending order of relevance to the provisionally selected setting item and generates the display table 24 (see FIG. 8) based on the general list 24a and the setting completion list 24b (S1109).

Subsequently, the display control unit 12 generates the display instruction (ordering the displaying of the icons of the target setting items at the appearance positions specified by the generated display table 24) and outputs the display instruction to the display unit 40.

The display unit 40 receiving the display instruction displays the icons of the target setting items around the provisionally selected icon at the positions specified by the display instruction (S1110), in which the icon of a target setting item having higher relevance to the provisionally selected setting item is placed closer to the provisionally selected icon, letting the user easily recognize the degrees of relevance between the provisionally selected setting item and the target setting items.

<Control Unit: Modification #1 of First Configuration>

The control unit 10 according to the first configuration may also be configured to further include a setting completion detecting unit 13 and a table modification unit 14 as shown in FIG. 7.

The setting completion detecting unit 13 is a unit for detecting the completion of the setting of each setting item by the user.

Specifically, the setting completion detecting unit 13 starts monitoring the user operation through the operation unit 30 when the user operating the operation unit 30 has completed the setting (changing the contents) of a setting item on the setting screen displayed on the display unit 40.

When another setting item on the setting screen is selected by a new user operation, the setting completion detecting unit 13 generates information indicating the changed setting item and the subsequently selected setting item (tendency information) and outputs the generated tendency information to the table modification unit 14.

For example, when the setting item #3 is selected from the setting screen 41 shown in FIG. 9 after a setting change of the setting item #1, the setting completion detecting unit 13 generates the tendency information indicating that the changed setting item is the "setting item #1" and the subsequently selected setting item is the "setting item #3" and outputs the generated tendency information to the table modification unit 14.

Incidentally, when no other setting item is selected after the completion of a setting change of a setting item (e.g. when the setting screen 41 is closed), the setting completion detecting unit 13 generates no tendency information.

Here, the "completion of a setting change of a setting item" includes a case where the detailed setting screen (unshown) of the setting item which has been displayed inside the setting screen 41 is closed by a user operation through the operation unit 30, a case where another setting item icon displayed on the setting screen is selected (clicked), etc.

The table modification unit 14 is a unit for modifying the relevance table 21 according to the tendency of the user operation.

Specifically, the table modification unit 14 changes (modifies) the degree of relevance between each pair of setting items (which has been stored in the relevance table 21) based on the tendency information supplied from the setting completion detecting unit 13.

For example, in the aforementioned case where the tendency information indicates that the changed setting item is the "setting item #1" and the subsequently selected setting item is the "setting item #3", the table modification unit 14 refers to the relevance table 21 and increases the degree of relevance (relevance index) between the setting items #1 and #3 in the table by a prescribed value.

When the prescribed value is "5", for example, the table modification unit 14 modifies the degree of relevance (relevance index) between the setting items #1 and #3 from "25" to "35".

The above configuration is employed for the following reason. When a user successively changes the contents (settings) of multiple setting items, the order of the setting changes varies depending on the preferences of the user, and thus it becomes possible to display the icons of the setting items on the setting screen 41 (when the user makes a setting change next time) in a state more incorporating the preferences of the user, by storing information on the order of setting changes actually made by the user and incorporating the information in the relevance table 21.

<Control Unit: Modification #2 of First Configuration>

While the aforementioned display control unit 12 of the control unit 10 according to the first configuration controls the display unit 40 so that the icon of a setting item having higher relevance to the provisionally selected setting item is displayed closer to the provisionally selected icon (see FIG. 10), the display control unit 12 may also be configured differently.

For example, the display control unit 12 may be configured to control the display unit 40 to display the icons of "relevant target setting items" (whose degrees of relevance to the provisionally selected setting item are a prescribed standard or higher) by overlapping them with the provisionally selected icon.

Here, a specific case where the icons of the setting items are displayed on the setting screen 41 based on the display table 24 generated when the provisionally selected setting item is the "setting item #5" (see FIG. 8) while regarding target setting items whose degrees of relevance (relevance indexes) to the provisionally selected setting item are "50" or higher as the "relevant target setting items" will be described by way of example.

Figure 12A:
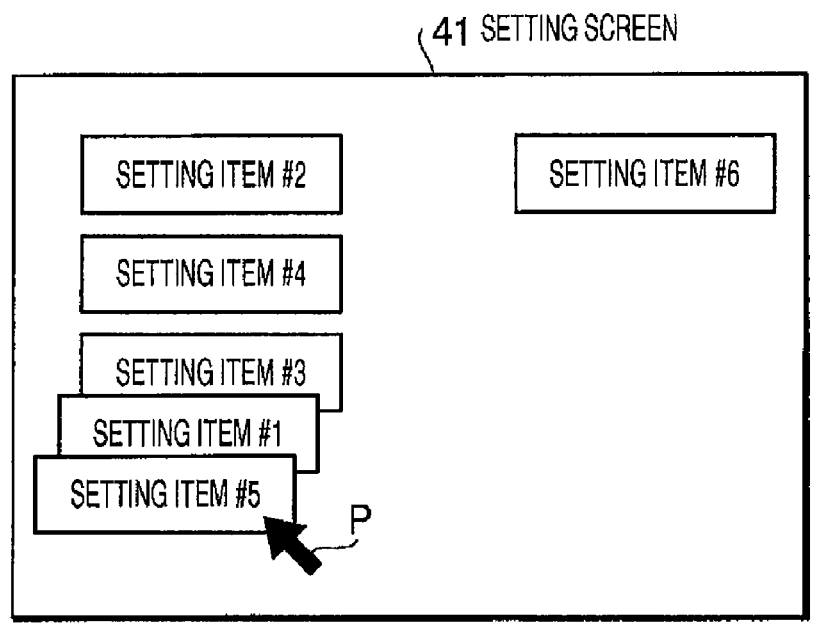
FIG. 12A is a schematic diagram for explaining a state in which icons of target setting items whose degrees of relevance to the provisionally selected setting item are a prescribed standard or higher are displayed by overlapping them with the provisionally selected icon on the setting screen.

Since the target setting items satisfying the condition "the relevance index to the provisionally selected setting item #5 is 50 or higher" in the relevance table 21 of FIG. 2 are the setting items #1 and #3 in this case, the icons originally displayed on the setting screen 41 as shown in FIG. 9 are moved to the positions shown in FIG. 12A, for example, at the point when the pointer P is moved onto the icon of the setting item #5.

With the display of the icons, the user is allowed to easily recognize setting items that need setting changes while also grasping the order of the setting changes.

Incidentally, when there exist two or more icons of target setting items to be overlapped with the provisionally selected icon, it is desirable to place the icon of a target setting item having a higher degree of relevance to the provisionally selected setting item as an upper layer (i.e. a layer closer to the provisionally selected icon).

For example, in the setting screen 41 shown in FIG. 12A, it is desirable to place the icon of the target setting item #1 over that of the target setting item #3 (as a layer closer to the icon of the provisionally selected setting item #5) since the setting item #1 has a higher degree of relevance to the provisionally selected setting item #5 compared to the setting item #3 in the relevance table 21 of FIG. 2.

With the display of the icons, the user can easily recognize the degrees of relevance of the "relevant target setting items" to the provisionally selected setting item based on the order of the overlapping display.

Further, the display control unit 12 may also be configured to control the display unit 40 to display the icons of "relevant target setting items" (whose degrees of relevance to the provisionally selected setting item are a prescribed standard or higher) by highlighting the icons.

The highlighting of an icon can be implemented by displaying the outer edge of the icon as a bold line, coloring the icon, etc.

Figure 12B:
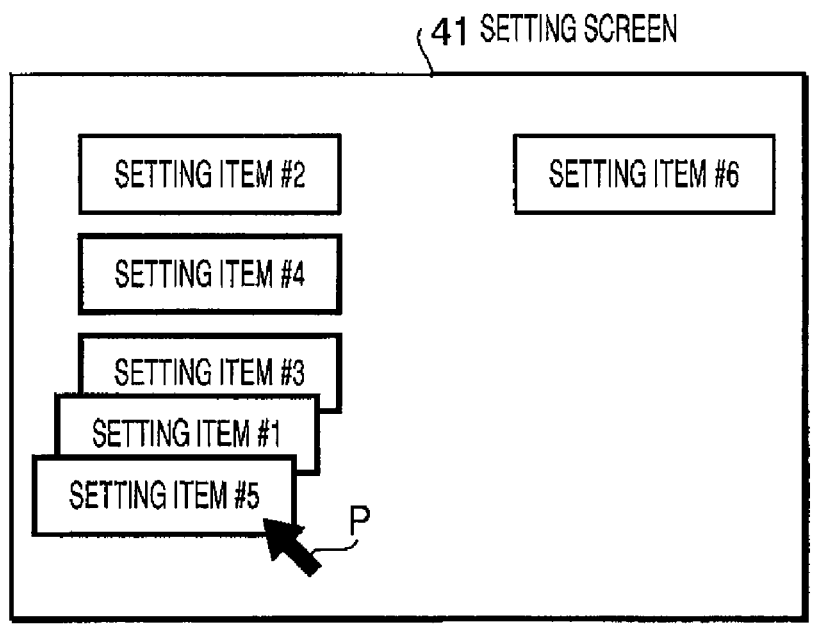
FIG. 12B is a schematic diagram for explaining a state in which icons of target setting items whose degrees of relevance to the provisionally selected setting item are a prescribed standard or higher are displayed by highlighting them on the setting screen of FIG. 12A.

Here, a specific case where the outer edges of the icons of target setting items whose degrees of relevance to the provisionally selected setting item #5 are "25" or higher are displayed as bold lines on the setting screen 41 of FIG. 12A (already employing the above overlapping display) will be described by way of example. In the relevance table 21 of FIG. 2, the above condition "25 or higher" is satisfied by the setting items #1, #3 and #4, and thus the outer edges of the icons of the target setting items #1, #3 and #4 on the setting screen 41 of FIG. 12A are drawn as bold lines as shown in FIG. 12B.

<Control Unit: Second Configuration>

In the following, a second configuration of the control unit, for letting the MFP 1 (information processing device in accordance with the present invention) desirably perform its main functions, will be described in detail.

In the MFP 1 (information processing device) equipped with the control unit according to the second configuration, when an icon of a setting item is provisionally selected by the user from multiple icons (corresponding to multiple setting items) displayed on the setting screen 41 for changing the setting of a function of the MFP 1, icons of setting items highly relevant to the provisionally selected setting item are displayed in the vicinity of the provisionally selected icon while also overlapping the icons of "dependent setting items" (setting items that are dependent on the provisionally selected setting item) with the provisionally selected icon, so as to let the user easily recognize setting items that need setting changes.

Figure 13:
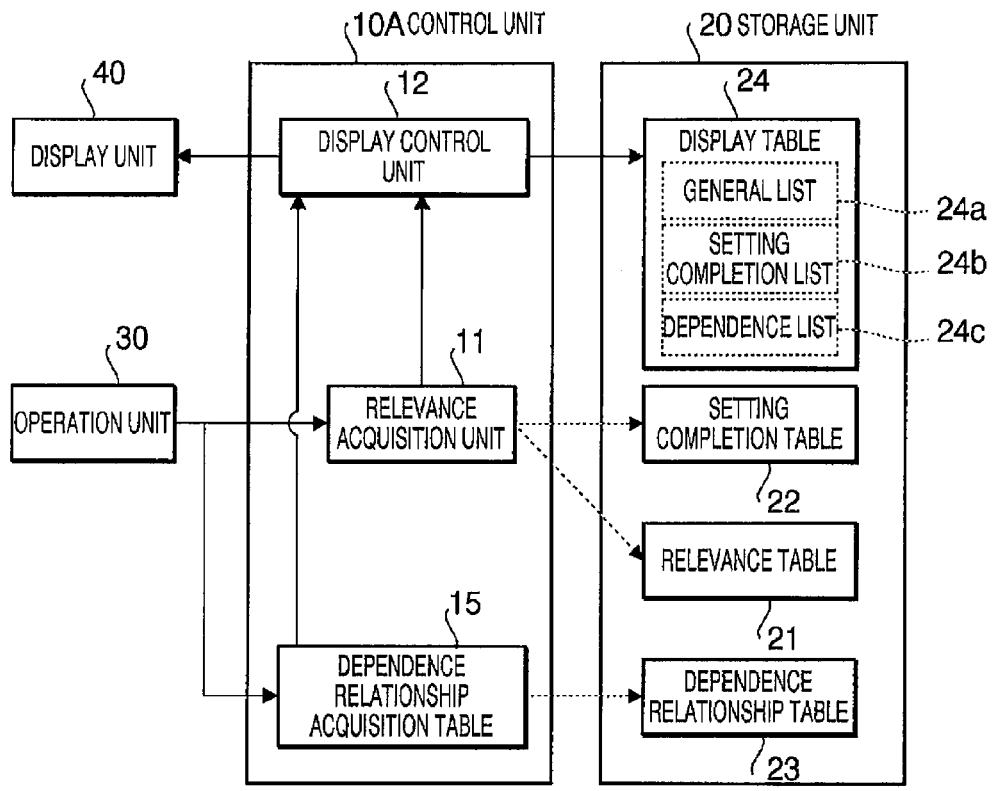
FIG. 13 is a block diagram for explaining a second configuration of the control unit and the relationship between the control unit and each table stored in the storage unit.

FIG. 13 is a block diagram for explaining the second configuration of the control unit.

As shown in FIG. 13, the control unit 10A according to the second configuration includes a relevance acquisition unit 11, a display control unit 12 and a dependence relationship acquisition unit 15 as its main components.

When one of the icons displayed on the setting screen (screen for setting the functions of the MFP 1) is provisionally selected, the relevance acquisition unit 11 refers to the relevance table 21 stored in the storage unit 20 and acquires the degree of relevance between the provisionally selected setting item and each of the target setting items (setting items corresponding to the other icons).

Specifically, when the pointer P is placed by the user operating the operation unit 30 on an icon on the setting screen 41 being displayed on the display unit 40, the operation unit 30 generates the provisional selection information indicating which icon (of a setting item) has been provisionally selected, that is, on which icon the pointer P has been placed. The generated provisional selection information is inputted to the relevance acquisition unit 11 and also to the dependence relationship acquisition unit 15.

The relevance acquisition unit 11 receiving the provisional selection information identifies the provisionally selected setting item based on the provisional selection information, acquires the degrees of relevance between the provisionally selected setting item and the target setting items by referring to the relevance table 21, generates the relevance information indicating the acquired relevance, and outputs the relevance information to the display control unit 12.

The details of the relevance information are identical with those in the first configuration described above and thus repeated description thereof is omitted here.

Further, the relevance acquisition unit 11 checks whether the setting of each target setting item has already been completed or not by referring to the setting completion table 22, generates the setting completion information (indicating whether the setting of each target setting item has been completed or not) and outputs the setting completion information to the display control unit 12.

The dependence relationship acquisition unit 15 is a unit for acquiring information on the dependence relationship between the provisionally selected setting item and each of the target setting items when one of the icons displayed on the setting screen (screen for setting the functions of the MFP 1) is provisionally selected.

Specifically, the dependence relationship acquisition unit 15 receiving the provisional selection information from the operation unit 30 identifies the provisionally selected setting item based on the provisional selection information, refers to the dependence relationship table 23 stored in the storage unit 20, and thereby acquires the information on the presence/absence of the dependence relationship between the provisionally selected setting item and each of the target setting items.

Here, a specific case where the provisionally selected setting item is the "setting item #1" will be described by way of example referring to the dependence relationship table 23 of FIG. 4.

In the case where the provisionally selected setting item specified by the provisional selection information is the setting item #1, the dependence relationship acquisition unit 15 checks whether or not there exists the dependence relationship between the provisionally selected setting item #1 and each of the target setting items #2-#6 by referring to the dependence relationship table 23, generates the dependence relationship information indicating the presence/absence of the dependence relationship, and outputs the generated dependence relationship information to the display control unit 12.

In the case of the dependence relationship table 23 of FIG. 4, only the setting item #5 is dependent on the provisionally selected setting item #1, and thus dependence relationship information indicating that the setting item #5 is dependent on the setting item #1 is generated by the dependence relationship acquisition unit 15. When there exists no setting item dependent on the provisionally selected setting item, dependence relationship information indicating that no setting item is dependent on the provisionally selected setting item is generated.

The display control unit 12 is a unit for the display control of the display unit 40. In the second configuration, when the pointer P is placed on one of the icons displayed on the setting screen (provisional selection), the display control unit 12 controls the display unit 40 so as to display an icon having a higher relevance to the provisionally selected icon at a position closer to the provisionally selected icon while also displaying icons of setting items dependent on the provisionally selected setting item by partially underlaying them under the provisionally selected icon.

Specifically, upon reception of the relevance information, the setting completion information and the dependence relationship information, the display control unit 12 generates a display table 24 specifying the appearance positions and the overlapping relationship of the icons of the target setting items on the setting screen 41, generates a signal (display data) for instructing the display unit 40 to display the icons of the target setting items according to the appearance positions and the overlapping relationship specified by the generated display table 24 (display instruction) and outputs the display instruction to the display unit 40.

Figure 14:
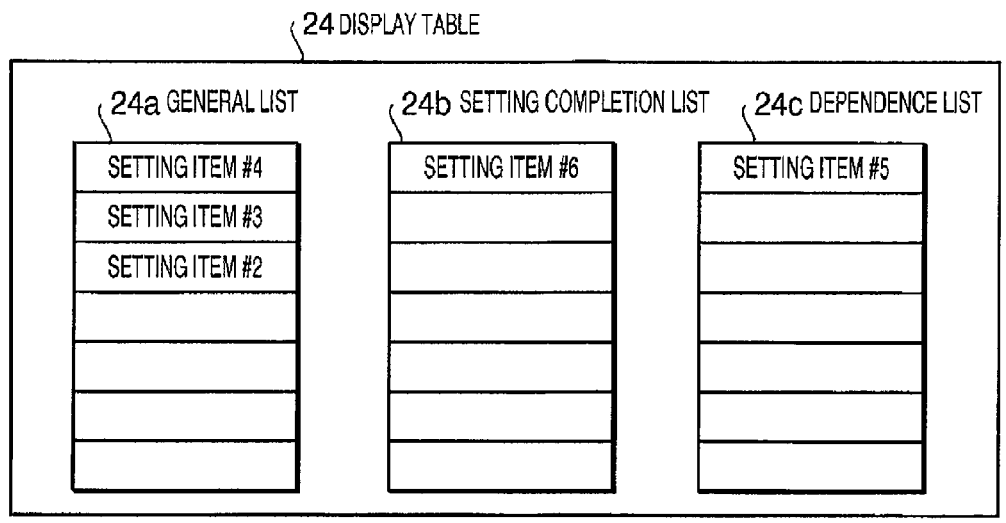
FIG. 14 is a table for briefly explaining the structure of a display table which is generated by the control unit according to the second configuration.

When the second configuration is employed, the display table 24 is formed to include a general list 24a, a setting completion list 24b and a dependence list 24c as shown in FIGS. 13 and 14.

In the general list 24a, the target setting items are listed in descending order of relevance to the provisionally selected setting item when one of the icons displayed on the setting screen is provisionally selected.

In the setting completion list 24b, target setting items for which the setting has been completed are listed when one of the icons displayed on the setting screen is provisionally selected.

In the dependence list 24c, target setting items that are dependent on the provisionally selected setting item are listed in descending order of relevance to the provisionally selected setting item when one of the icons displayed on the setting screen is provisionally selected.

In this display table 24 (in the second configuration), the appearance positions and the overlapping relationship of the icons of the target setting items on the setting screen are specified according to the following rules: The icons of the target setting items listed in the setting completion list 24b should be displayed at positions far from the provisionally selected icon on the setting screen irrespective of the degree of relevance to the provisionally selected icon. The icons of the target setting items listed in the general list 24a should be displayed on the setting screen so that the distance between the provisionally selected icon and the icon of each target setting item increases in order of the list (i.e. as the relevance to the provisionally selected setting item decreases). The icons of the target setting items listed in the dependence list 24c should be displayed by partially underlaying them under the provisionally selected icon in the order of the list.

Therefore, the display control unit 12 of the control unit 10A according to the second configuration extracts setting items for which the setting has already been completed from the target setting items based on the setting completion information supplied from the relevance acquisition unit 11 and stores the extracted setting items in the setting completion list 24b. The display control unit 12 further extracts setting items dependent on the provisionally selected setting item from the remaining target setting items (for which the setting has not been completed yet) based on the dependence relationship information supplied from the dependence relationship acquisition unit 15 and stores the extracted setting items in the dependence list 24c, while storing the finally remaining setting items in the general list 24a.

Subsequently, the display control unit 12 sorts the target setting items stored in each list (general list 24a, setting completion list 24b, dependence list 24c) in the descending order of relevance to the provisionally selected setting item based on the relevance information supplied from the relevance acquisition unit 11. Based on the general list 24a, the setting completion list 24b and the dependence list 24c prepared as above, the display table 24 is generated.

Thereafter, the display control unit 12 generates the display instruction (for instructing the display unit 40 to display the icons of the target setting items according to the appearance positions and the overlapping relationship specified by the generated display table 24) and outputs the display instruction to the display unit 40.

Here, a specific case where the contents of the relevance information are generated based on the relevance table 21 shown in FIG. 2, the contents of the setting completion information are generated based on the setting completion table 22 shown in FIG. 3, the contents of the dependence relationship information are generated based on the dependence relationship table 23 shown in FIG. 4 and the provisionally selected setting item is the setting item #1 will be described by way of example.

The display control unit 12 extracts the setting item #6 for which the setting has already been completed from the target setting items #2-#6 (setting items other than the provisionally selected setting item #1) based on the setting completion information, and stores the extracted setting item #6 in the setting completion list 24b. The display control unit 12 further extracts the setting item #5 dependent on the provisionally selected setting item #1 from the remaining target setting items #2-#5 based on the dependence relationship information and stores the extracted setting item #5 in the dependence list 24c, while storing the finally remaining setting items #2-#4 in the general list 24a.

Subsequently, the display control unit 12 sorts the target setting items stored in each list (general list 24a, setting completion list 24b, dependence list 24c) in the descending order of relevance to the provisionally selected setting item #1 based on the relevance information. In this specific case, the sorting is unnecessary for the setting completion list 24b including the setting item #6 only and the dependence list 24c including the setting item #5 only.

Since the general list 24a includes the setting items #4, #3 and #2 as mentioned above and their degrees of relevance (relevance indexes) to the provisionally selected setting item #1 are "70", "50" and "25" (see FIG. 2), the setting items are successively stored in the general list 24a in the order of #4, #3 and #2 as shown in FIG. 14.

Subsequently, the display control unit 12 generates the display table 24 explained above by use of the general list 24a, the setting completion list 24b and the dependence list 24c. Thereafter, the display control unit 12 generates the display instruction (ordering the displaying of the icons of the target setting items according to the appearance positions and the overlapping relationship specified by the generated display table 24) and outputs the display instruction to the display unit 40.

Specifically, the above display instruction generated by the display control unit 12 instructs the display unit 40 to display the icon of the setting item #6 (stored in the setting completion list 24b) at a position farthest from the icon of the provisionally selected setting item #1, to display the icons of the setting items #4, #3 and #2 (stored in the general list 24a in this order) so that the icons gradually become farther (in the order of #4, #3 and #2) from the icon of the provisionally selected setting item #1 (with the icon of the setting item #4 placed in the close vicinity of the icon of the provisionally selected setting item #1), and to display the icon of the setting item #5 (stored in the dependence list 24c) by partially underlaying it under the icon of the provisionally selected setting item # 1.

On the display unit 40, the icons of the target setting items #2-#6 are displayed around the icon of the provisionally selected setting item #1 according to the appearance positions and the overlapping relationship specified by the display instruction, in which the icon of a setting item having a higher degree of relevance to the provisionally selected setting item #1 is placed closer to the icon of the provisionally selected setting item #1 and the icon of the setting item #5 (dependent on the provisionally selected setting item #1) is partially underlaid under the icon of the provisionally selected setting item #1. Therefore, the user is allowed to easily recognize and grasp the degrees of relevance and the presence/absence of the dependence relationship between the provisionally selected setting item #1 and the target setting items #2-#6.

To sum up, when the pointer P is moved by the user operating the operation unit 30 onto the icon of the setting item #1 (provisional selection) on the setting screen 41 shown in FIG. 9, the icons of setting items having high relevance to the provisionally selected setting item #1 (setting items #4 and #3) are displayed at positions close to the provisionally selected icon, in which the icon of a setting item having a higher degree of relevance to the provisionally selected setting item #5 is displayed closer to the provisionally selected icon while the icons of setting items dependent on the provisionally selected setting item #1 (setting item #5) are partially underlaid under the provisionally selected icon (see FIG. 17A) by a process executed by the aforementioned units of the control unit 10A.

In the following, information processing executed by an information processing device that is equipped with the control unit 10A according to the second configuration shown in FIG. 13 will be explained referring to flow charts of FIGS. 15 and 16.

First, when the user viewing the setting screen 41 of FIG. 9 displayed on the display unit 40 provisionally selects an icon of a setting item (e.g. setting item #1) by moving the pointer P onto the icon (S1501), the provisional selection information is generated by the operation unit 30 and outputted to the relevance acquisition unit 11 and the dependence relationship acquisition unit 15.

The relevance acquisition unit 11 receiving the provisional selection information identifies the provisionally selected setting item, refers to the relevance table 21, and thereby acquires the degree of relevance between the provisionally selected setting item and each of the target setting items. Subsequently, the relevance acquisition unit 11 generates the relevance information indicating the acquired relevance (S1502) and outputs the generated relevance information to the display control unit 12.

Further, the relevance acquisition unit 11 checks whether the setting of each target setting item (regarding a function of the information processing device) has been completed or not by referring to the setting completion table 22, generates the setting completion information indicating whether the setting of each target setting item has been completed or not (S1503) and outputs the generated setting completion information to the display control unit 12.

Meanwhile, the dependence relationship acquisition unit 15 receiving the provisional selection information identifies the provisionally selected setting item, refers to the dependence relationship table 23, and thereby acquires the information on the presence/absence of the dependence relationship between the provisionally selected setting item and each of the target setting items. Subsequently, the dependence relationship acquisition unit 15 generates the dependence relationship information indicating the dependence relationship (S1504) and outputs the generated dependence relationship information to the display control unit 12.

The display control unit 12 receiving the relevance information, the setting completion information and the dependence relationship information generates the display table 24 specifying the appearance positions and the overlapping relationship of the icons to be displayed on the setting screen (S1505). The details of the step S1505 will be described later. Subsequently, the display control unit 12 generates the display instruction (ordering the displaying of the icons of the target setting items according to the appearance positions and the overlapping relationship specified by the generated display table 24) and outputs the display instruction to the display unit 40.

On the setting screen displayed by the display unit 40, the icon of the setting item #5 dependent on the provisionally selected setting item #1 is overlapped with (partially underlaid under) the icon of the provisionally selected setting item #1 and the icons of setting items highly relevant to the provisionally selected setting item #1 (setting items #3 and #4) are displayed at positions close to the provisionally selected icon according to the display instruction (S11506).

Figure 15:
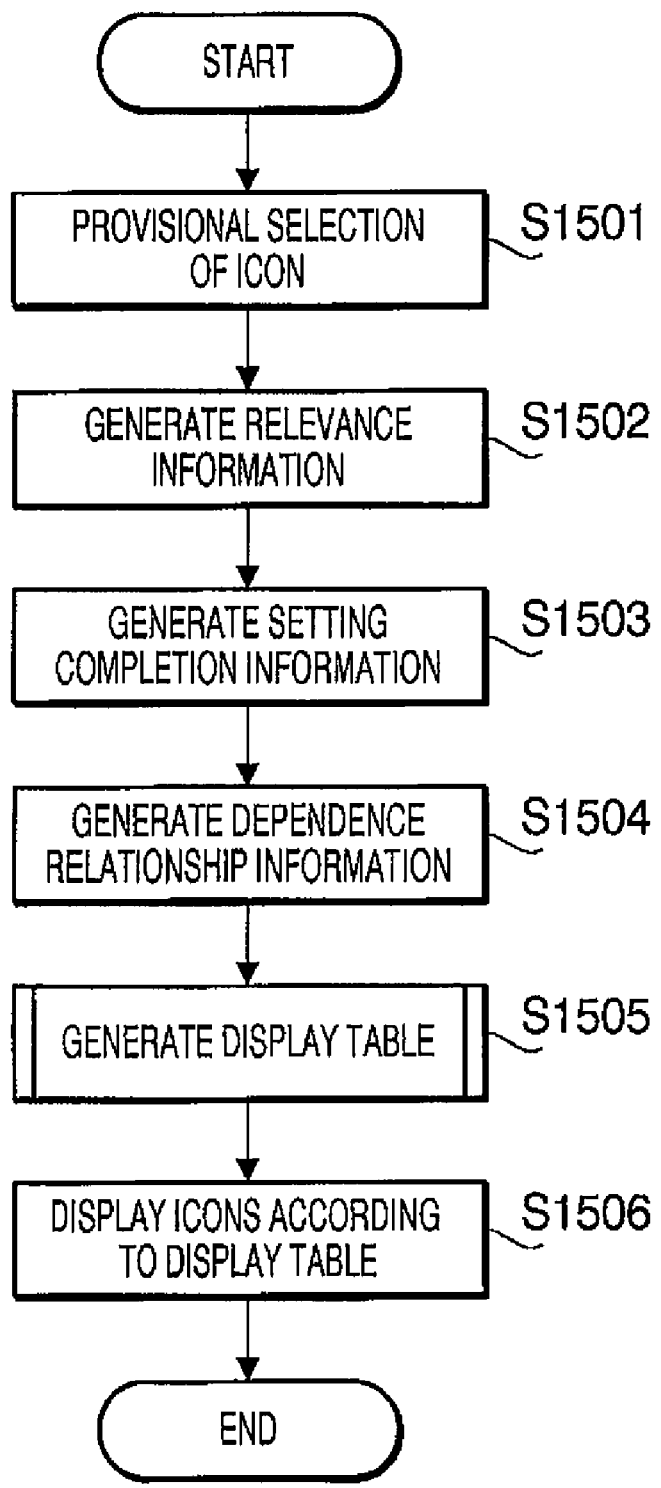
FIG. 15 is a flow chart for explaining information processing executed by an information processing device that is equipped with the control unit according to the second configuration shown in FIG. 13.
Figure 16:
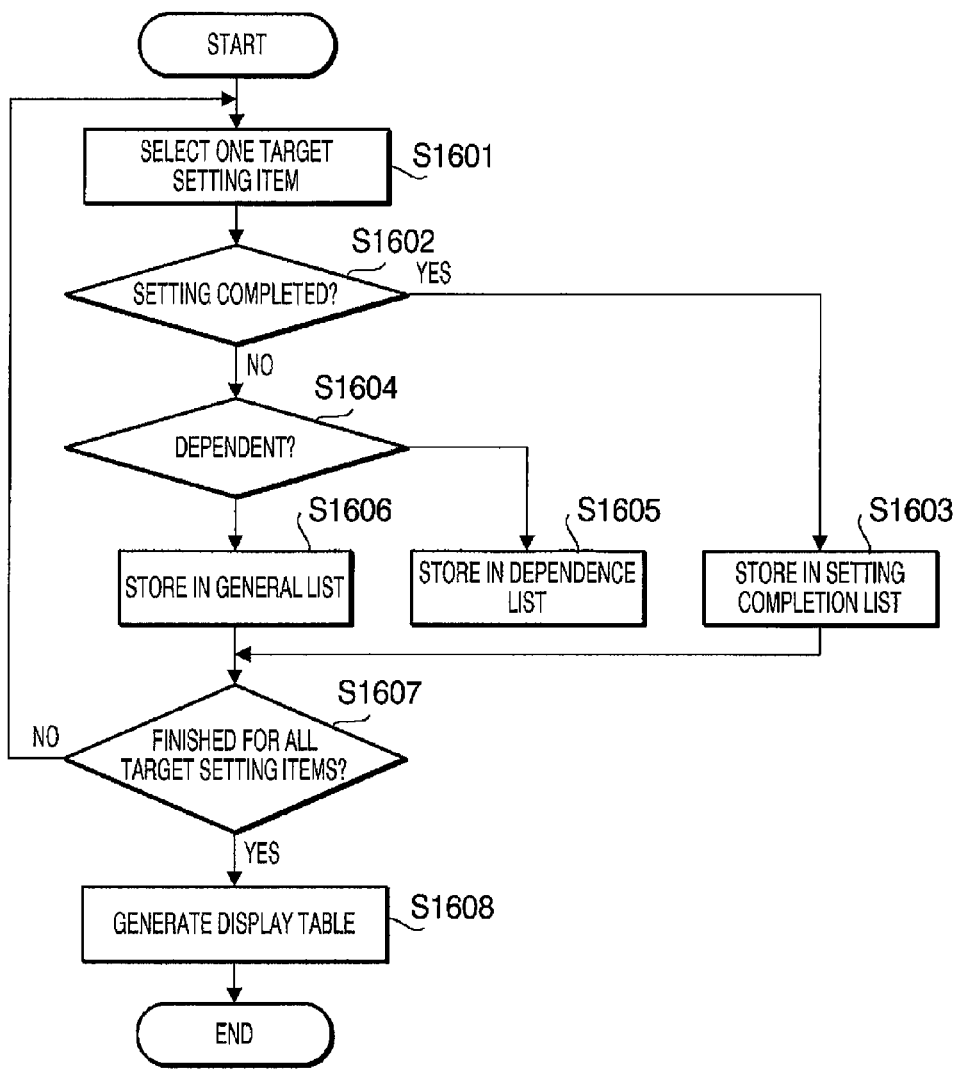
FIG. 16 is a flow chart showing the details of step S1505 (generation of a display table) in FIG. 15.

FIG. 16 is a flow chart showing the details of the step S1505 in FIG. 15 (the generation of the display table 24 by the display control unit 12).

The display control unit 12 receiving the relevance information, the setting completion information and the dependence relationship information selects one of the target setting items as a target of inspection in order to successively distribute the target setting items into appropriate lists (general list 24a, setting completion list 24b, dependence list 24c) of the display table 24 (S1601).

Subsequently, the display control unit 12 checks whether the setting of the target setting item as the inspection target has already been completed or not by referring to the setting completion information (S1602). If the setting has already been completed (S1602: YES), the target setting item is stored in the setting completion list 24b (S1603)

If the setting has not been completed yet (S1602: NO), the display control unit 12 checks whether the target setting item (as the inspection target) is dependent on the provisionally selected setting item or not by referring to the dependence relationship information (S1604). If the target setting item is dependent on the provisionally selected setting item (S1604: YES), the target setting item is stored in the dependence list 24c (S1605), otherwise (S1604: NO) the target setting item is stored in the general list 24a (S1606).

Subsequently, the display control unit 12 checks whether the distribution has been finished for all the target setting items or not (S1607). If the distribution has not been finished for all the target setting items (S1607: NO), the distribution of S1601-S1606 is repeated until all the target setting items are processed.

If the distribution has been finished for all the target setting items (S1607: YES), the display control unit 12 sorts the target setting items stored in each list in the descending order of relevance to the provisionally selected setting item and generates the display table 24 (see FIG. 14) based on the general list 24a, the setting completion list 24b and the dependence list 24c (S1608).

<Control Unit: Modification #1 of Second Configuration>

The control unit 10A according to the second configuration may also be configured to further include the setting completion detecting unit 13 and the table modification unit 14 (included in the aforementioned control unit 10 according to the modification #1 of the first configuration).

With this configuration, effects similar to those of the control unit 10 according to the modification #1 of the first configuration can be achieved also by the control unit 10A according to the second configuration.

<Control Unit: Modification #2 of Second Configuration>

Further, the display control unit 12 of the control unit 10A according to the second configuration may also be configured to control the display unit 40 to display the icons of "relevant target setting items" (whose degrees of relevance to the provisionally selected setting item are a prescribed standard or higher) by highlighting the icons.

Figure 17A:
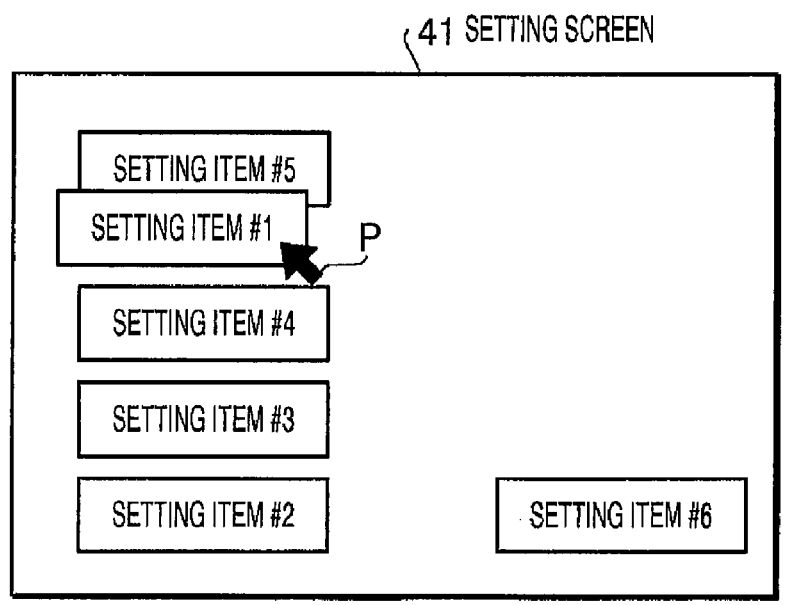
FIG. 17A is a schematic diagram for explaining a state in which the icon of a target setting item that is dependent on the provisionally selected setting item is partially underlaid under the provisionally selected icon on the setting screen.
Figure 17B:
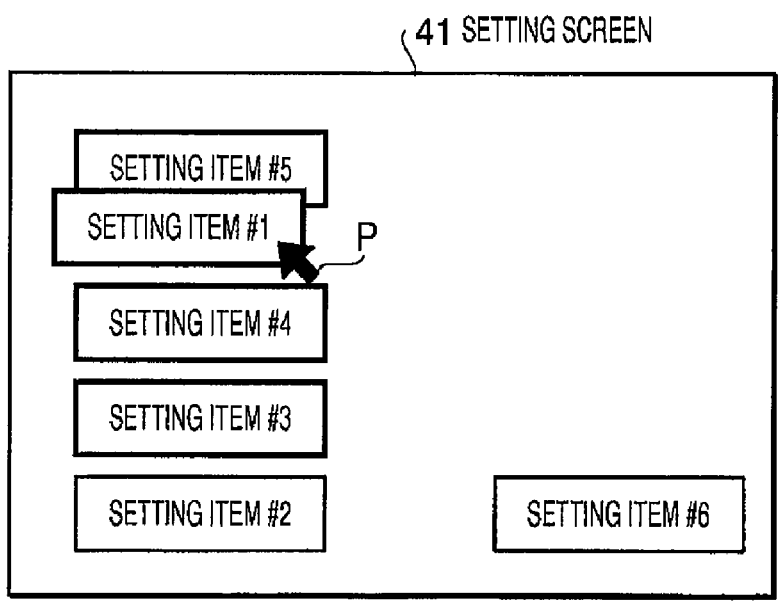
FIG. 17B is a schematic diagram for explaining a state in which icons of target setting items whose degrees of relevance to the provisionally selected setting item are a prescribed standard or higher are displayed by highlighting them on the setting screen of FIG. 17A.

Here, a specific case where the outer edges of the icons of target setting items whose degrees of relevance to the provisionally selected setting item #1 are "25" or higher are displayed as bold lines on the setting screen 41 of FIG. 17A will be described by way of example. In the relevance table 21 of FIG. 2, the above condition "25 or higher" is satisfied by the setting items #3, #4 and #5, and thus the outer edges of the icons of the target setting items #3, #4 and #5 on the setting screen 41 of FIG. 17A are drawn as bold lines as shown in FIG. 17B.

<Another Example of Dependence Relationship Table>

While the above explanation of the dependence relationship acquisition unit 15 of the control unit 10A according to the second configuration was given assuming that only one setting item (#5) is dependent on the provisionally selected setting item (#1) as in the dependence relationship table 23 of FIG. 4, there are cases where two or more setting items are dependent on the provisionally selected setting item.

Therefore, another specific case where the dependence relationship table 23 show in FIG. 18 is employed and the provisionally selected setting item is the "setting item #1" will be described here by way of example.

In this case (see FIG. 18), the setting item #5 is dependent on the setting item #1, and the setting item #3 is dependent on the setting items #1 and #5. In other words, the setting items #3 and #5 are dependent on the provisionally selected setting item # 1.

Therefore, in the case where the provisionally selected setting item specified by the provisional selection information is the setting item #1, the dependence relationship acquisition unit 15 generates the dependence relationship information indicating that the setting items #3 and #5 are dependent on the provisionally selected setting item #1.

According to the dependence relationship information, the setting items #3 and #5 are stored in the dependence list 24c of the display table 24 which is generated by the display control unit 12. Since the setting item #5 has a higher degree of relevance to the provisionally selected setting item #1 than the setting item #3 in the relevance table 21 of FIG. 2, the setting item #5 is ranked above the setting item #3 in the dependence list 24c.

On the setting screen, the icons of the setting items #3 and #5 (dependent on the provisionally selected setting item #1) are partially underlaid under the icon of the setting item #1, in which the icon of the setting item #5 (more relevant to the provisionally selected setting item #1) is placed over the icon of the setting item #3, that is, placed closer to the icon of the setting item #1.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

For example, while the explanation of the information processing device in accordance with the present invention (MFP 1) was given assuming that the display unit 40 displaying the setting screen is provided integrally with the information processing device, the display unit 40 may also be provided separately from the information processing device. In this case, the aforementioned effects can be achieved similarly by connecting the display unit 40 to the information processing device by a cable or wireless connection.

The present invention is not to be restricted to information processing devices. The present invention can also be realized as a single program for letting a computer implement the functions of the information processing device described above or a set of programs for achieving the functions of the above information processing device.

In this case, the functions specified by the program(s) (for letting a computer implement the functions of the above information processing device) can be realized on the computer by prestoring the program(s) in a record medium (e.g. RAM, ROM, flash memory, EEPROM, CD-medium, DVD-medium, temporary storage, hard disk drive, floppy disk, permanent storage, etc.) and letting the computer (control unit) execute the program(s) as needed by reading out the program(s) from the record medium.

While an MFP 1 has been described above as an example of an information processing device in accordance with the present invention, the present invention is applicable to any information processing device that requires settings for the use of its functions.

While the present invention has been applied to a case where a user hoping to use functions of an information processing device (MFP 1) makes settings of the information processing device by operating the device itself (i.e. by viewing the setting screen displayed on the device itself) in the above embodiment, the present invention is also applicable to cases where a user hoping to use functions of an external device makes settings of the external device by operating an information processing device capable of communicating with the external device (i.e. by viewing the setting screen displayed on the information processing device).

What is claimed is:

1. An information processing device having multiple setting items, comprising:
   a relevance table defining a degree of relevance between each pair of setting items included in the multiple setting items;
   a display unit configured to display icons respectively corresponding to the multiple setting items;
   a selecting unit configured to select one of the icons displayed on the display unit;
   a relevance acquisition unit which acquires the degree of relevance between a selected setting item corresponding to the selected icon and each of the other setting items by referring to the relevance table when one of the icons displayed by the display unit is selected;
   a display control unit which rearranges the icons displayed on the display unit such that the icon corresponding to the selected setting item and the icons respectively corresponding to the other setting items are arranged in accordance with the degrees of relevance acquired by the relevance acquisition unit to indicate the relevance thereamong, wherein the display control unit displays the icons of the selected setting item and the other setting items such that an icon corresponding to a setting item having a higher degree of relevance to the selected setting item is located at a position closer to the selected icon;
   a dependence relationship table storing information on dependence relationship between each pair of setting items included in the multiple setting items; and
   a dependence relationship acquisition unit which acquires the information on the dependence relationship between the selected setting item and each of the other setting items by referring to the dependence relationship table when one of the icons displayed by the display unit is selected,
   wherein the display control unit displays the icons corresponding to setting items dependent on the selected setting item by partially underlaying the icons corresponding to the selected icon based on the information on the dependence relationship acquired by the dependence relationship acquisition unit.

2. The information processing device according to claim 1, wherein, when there exist a plurality of setting items dependent on the selected setting item, the display control unit displays the icons corresponding to the plurality of setting items with locating the icon of a setting item having a higher degree of relevance to the selected setting item as an upper layer stacked over the icons of less relevant setting items based on the degrees of relevance acquired by the relevance acquisition unit.

3. The information processing device, according to claim 1,
wherein the display control unit displays the icons of the selected setting item and the other setting items on the display unit such that the icons of other setting items whose degrees of relevance to the selected setting item acquired by the relevance acquisition unit are a prescribed standard or higher are partially overlapped with the selected icon, the icon corresponding to a setting item having a higher degree of relevance being placed as an upper layer stacked over the icons of less relevant setting items.

4. The information processing device according to claim 1, further comprising:
   a setting completion detecting unit which detects completion of setting of each setting item; and
   a table modification unit capable of modifying the relevance table,
   wherein the table modification unit modifies the relevance table to increase the degree of relevance between a first setting item and a second setting item in the relevance table when the icon of the second setting item is selected just after the completion of the setting of the first setting item is detected by the setting completion detecting unit.

5. The information processing device according to claim 1, wherein the display control unit highlights the icons of setting items whose degrees of relevance to the selected setting item are a prescribed standard or higher, respectively.

6. A non-transitory record medium storing computer-readable instructions that cause a computer of an information processing device having multiple setting items to function as:
   a selecting unit configured to select one of icons displayed on a display unit configured to display icons respectively corresponding to the multiple setting items;
   a relevance acquisition unit which refers to a relevance table indicating the degree of relevance between each pair of setting items included in the multiple setting items in order to acquire the degree of relevance between a selected setting item corresponding to the selected icon and each of the other setting items when one of icons displayed by the display unit is selected;
   a display control unit which displays the icons on the display unit such that the icon corresponding to the selected setting item and the icons respectively corresponding to the other setting items are arranged in accordance with the degrees of relevance acquired by the relevance acquisition unit so that the degree of relevance is represented, wherein the instructions cause the display control unit to display the icons of the selected setting item and the other setting items such that an icon corresponding to a setting item having a higher degree of relevance to the selected setting item is located at a position closer to the selected icon; and
   a dependence relationship acquisition unit
      which refers to a dependence relationship table storing information on dependence relationship between each pair of setting items included in the multiple setting items and
      which acquires the information on the dependence relationship between the selected setting item and each of the other setting items by referring to the dependence relationship table when one of the icons displayed by the display unit is selected,
   wherein the display control unit displays the icons corresponding to setting items dependent on the selected setting item by partially underlaying the icons corresponding to the selected icon based on the information on the dependence relationship acquired by the dependence relationship acquisition unit.

7. The record medium according to claim 6, wherein the instruction cause the computer to further function as:

a setting completion detecting unit which detects completion of setting of each setting item; and a table modification unit capable of modifying the relevance table, wherein the table modification unit modifies the relevance table to increase the degree of relevance between a first setting item and a second setting item in the relevance table when the icon of the second setting item is selected just after the completion of the setting of the first setting item is detected by the setting completion detecting unit.

8. The record medium according to claim 6, wherein the instruction cause the computer to highlight the icons corresponding to setting items whose degrees of relevance to the selected setting item are a prescribed standard or higher.

9. An icon displaying method for displaying icons corresponding to multiple setting items of a device on a display unit, comprising the steps of:

selecting one of icons displayed on the display unit;

referring to a relevance table, which indicates the degree of relevance between each pair of setting items included in the multiple setting items, to acquire the degree of relevance between a selected setting item corresponding to the selected icon and each of the other setting items in response to one of icons displayed by the display unit being selected;

rearranging the icons displayed on the display unit such that the icons corresponding to the other setting items are rearranged based on the acquired degrees of relevance to indicate the degrees of relevance and locating the icon of a setting item having a higher degree of relevance to the selected setting item at a position closer to the selected icon; and acquiring information on dependence relationship between the selected setting item and each of the other setting items by referring to a dependence relationship table storing the information on the dependence relationship between each pair of setting items included in the multiple setting items in response to one of the icons displayed by the display unit being selected, wherein the step of rearranging the icons displays the icons corresponding to setting items dependent on the selected setting item by partially underlaying the icons under the selected icon based on the information on the dependence relationship acquired by the step of acquiring.

10. The icon displaying method according to claim 9, further comprising the step of:

detecting completion of setting of each setting item; and modifying the relevance table to increase the degree of relevance between a first setting item and a second setting item in the relevance table when the icon of the second setting item is selected just after the completion of the setting of the first setting item is detected by the setting completion detecting step.

11. The icon displaying method according to claim 9, wherein the step of rearranging highlights the icons corresponding to setting items whose degrees of relevance to the selected setting item are a prescribed standard or higher.

* * * * *

UNITED STATES PATENT AND TRADEMARK OFFICE
CERTIFICATE OF CORRECTION

| | | |
|---|---|---|
| PATENT NO. | : 7,921,378 B2 | Page 1 of 1 |
| APPLICATION NO. | : 11/861261 | |
| DATED | : April 5, 2011 | |
| INVENTOR(S) | : Atsushi Kojima | |

It is certified that error appears in the above-identified patent and that said Letters Patent is hereby corrected as shown below:

Cover Page, between Section 65 and Section 51, please add the following Section 30:

Foreign Application Priority Data
Sep. 29, 2006 (JP) ........................2006-268023

Signed and Sealed this
Fourth Day of October, 2011

David J. Kappos
*Director of the United States Patent and Trademark Office*